United States Patent [19]

Fertig

[11] Patent Number: 4,705,069

[45] Date of Patent: Nov. 10, 1987

[54] DIRECTIONAL CONTROL VALVE HAVING A BUILT-IN FLOW CONTROL VALVE

[75] Inventor: Günter Fertig, Wertheim, Fed. Rep. of Germany

[73] Assignee: Mannesmann Rexroth GmbH, Lohr, Fed. Rep. of Germany

[21] Appl. No.: 812,325

[22] Filed: Dec. 23, 1985

[30] Foreign Application Priority Data

Dec. 21, 1984 [DE] Fed. Rep. of Germany ....... 3446945

[51] Int. Cl.⁴ ............................................. F15B 13/04
[52] U.S. Cl. ..................................... 137/596; 91/446; 137/625.68
[58] Field of Search .............. 91/446; 137/596, 625.68

[56] References Cited

U.S. PATENT DOCUMENTS 3,910,311 10/1975 Wilke .................................. 137/596
4,362,087 12/1982 Budzich ............................ 91/446 X Primary Examiner—Gerald A. Michalsky
Attorney, Agent, or Firm—Cushman, Darby & Cushman

[57] ABSTRACT

A directional control valve comprising a valve housing, tank-, user-, and pump-ports provided in said housing, a spool reciprocally mounted in said housing and adapted to connect and/or separate said ports, and a pilot controlled flow control valve within said directional control valve.

18 Claims, 3 Drawing Figures

DIRECTIONAL CONTROL VALVE HAVING A BUILT-IN FLOW CONTROL VALVE

The invention relates to a directional control valve and, in particular, to a directional spool valve.

Directional control valves in general and directional spool valves in particular are known in a large number of types, and they are frequently used together with flow control valves. For example, the directional control valves as well as the flow control valves can be provided in the so-called sandwich design, so that said valves can be combined in an economical manner. The use of a flow control valve is desireable for many applications and, in particular, in circumstances where a use has to be supplied with a predetermined amount of pressure medium independent of the pressure existing at the load. It may be said in general terms that flow control valves will be used in situations where it is necessary to maintain the operating speed of a hydraulic cylinder or the rotary speed of a hydromotor independent of the pressure differential occuring at the flow control valve and independent of the temperature and of the viscosity of the pressure liquid.

It is possible to distinguish between two-directional and three-directional flow control valves. Generally, a two-directional flow control valve has the disadvantage that the remaining pressure liquid flow not required by the user will be throttled by means of a pressure relief valve while the pump needs to generate the maximum operating pressure independent of the required pressure.

Three-directional flow control valves do not have this disadvantage inasmuch as the remaining pressure medium flow which is not required by the user; will be returned to the tank via a bypass without any larger pressure losses.

A directional control valve comprising a built-in but not a pilot controlled flow control valve is already known from German published application DE-OS No. 33 46 463.

In a single stage two-directional flow control valve, the functions of a metering element and of an adjustment element will be carried out by a single component, i.e. a pressure compensator. In contrast thereto, different components are provided for the functions of the metering element and of the adjustment element in a so-called pilot controlled two-directional flow control valve. In such a known two-directional flow control valve, the pressure differential at a metering orifice will be metered or determined by a separate pressure compensator and compared with the force of a spring. The pressure compensator will then control the adjustment element proper. The adjustment element will then maintain the pressure differential at the metering orifice constant and, as a consequence, also the volumetric flow of the pressure liquid will be maintained constant. Such a pilot controlled flow control valve has the advantage that the pilot control can compensate for disturbing forces to a large degree.

It is an object of the present invention to design a directional control valve, in particular, a directional spool valve in such a manner that it has the combined characteristics of a directional control valve and of a pilot controlled flow control valve.

It is another object of the present invention to provide a directional control valve with a built-in flow control valve.

According to another object of the invention a directional control valve with a built-in flow control valve is to be designed in such a manner that the desired control of the flow is achieved for a connection of a pump with a user as well as for a connection of a user with a tank.

In accordance with a preferred embodiment of the invention a flow control valve is located in the spool of a directional control valve, and preferably the flow control valve is a two directional flow control valve. In accordance with a particularly preferred embodiment of the invention a pilot controlled two-directional flow control valve is built into the spool of a directional control valve.

In accordance with the invention any type of directional control valve may be realized. In particular, a so-called 4/3-directional control valve having the characteristics of a pilot controlled flow control valve may be realized or a 3/2-directional control valve again having the characteristics of a pilot controlled flow control valve may be realized.

Preferred embodiment of the invention are claimed in the claims and may be gathered from the following description of embodiments.

Additional advantages, objects and details of the invention may be gathered from the following description of embodiments shown in the drawing.

As was mentioned initially, so-called single stage flow control valves are known for which a pressure compensator in the form of a two-directional valve provides for the function of a metering element as well as of an adjustment element. The present invention relates, in particular, to so-called pilot-operated, i.e. two-stage flow control valves for which disturbing forces can be largely removed due to the controlling action.

Figure 1:
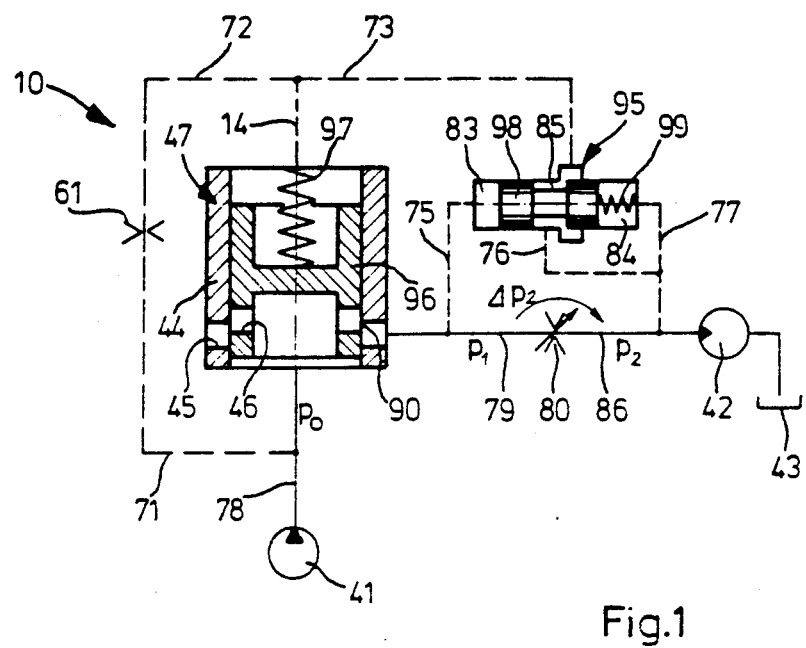
FIG. 1 is a schematic representation of a pilot controlled (i.e. two-stage type) two-directional flow control valve substantially known from the prior art.

FIG. 1 discloses a schematic representation showing the function of a pilot operated two-directional flow control valve 10 of the spool type.

The two-directional flow control valve 10 is arranged between a pump 41 and a user 42. The output of the user 42 is connected to a tank 43. The flow control valve 10 comprises essentially adjusting means 47 and a pressure compensator 95 having a metering orifice 80 arranged thereto in parallel.

The adjustment means 47 comprise a housing 44 and an adjustment spool 96 slidably mounted within said housing 44. Due to the movement of the adjustment piston (spool) 96 radial bores 45 located in housing 44 can be brought into more or less alignment with radial bores 46 arranged in the adjustment spool 96. It should be noted that between the radial bores 45 and 46 a throttle position 90 is formed. An adjustment or pressure spring 97 imparts a force onto the adjustment spool 96, a force which acts against the pressure $p_o$ of the pump 41.

The pressure compensator 95 is formed by a control piston 98 biassed by means of a control spring 99. Adjacent to the two piston heads of the control piston 98 pressure end spaces 83, 84 are provided. Between the piston heads a pressure medium space 85 is formed.

Pump 41 is connected via a pressure line with the one side of adjustment spool 96. Also, pressure medium supplied by the pump 41 is delivered via a control line 71, metering orifice 61 and control lines 72 and 14 to the other end of the adjustment spool 96. Moreover, a control line 73 provides for a connection to the pressure medium space 85. The radial bores 45, i.e. for all practical purposes the throttle position 90, are connected at their output end via a pressure line 79 with the metering orifice 80. The pressure existing in pressure line 79 is designated $p_1$. This pressure $p_1$ is also supplied via a control line 75 to the pressure end space 83.

Between the radial bores 46 and 45, i.e. at the throttle position 90 a pressure differential $\Delta p_1 = p_0 - p_1$ occurs; $p_0$ refers to the pressure supplied by pump 41. The pressure differential $p_2 - p_1$ occuring at the metering orifice 80 is referred to as $\Delta p_2$.

The throttle position 80 is connected at its output end via a pressure line 86 with the user 42. Further, the pressure end space 84 is connected via a control line 77 with the pressure line 86. Under normal conditions the pressure medium space 85 is connected via control line with the tank 43.

In accordance with the present invention the pressure medium space 85 is connected via a control line 76 with the output of the metering orifice (throttle position) 80.

Figure 2:
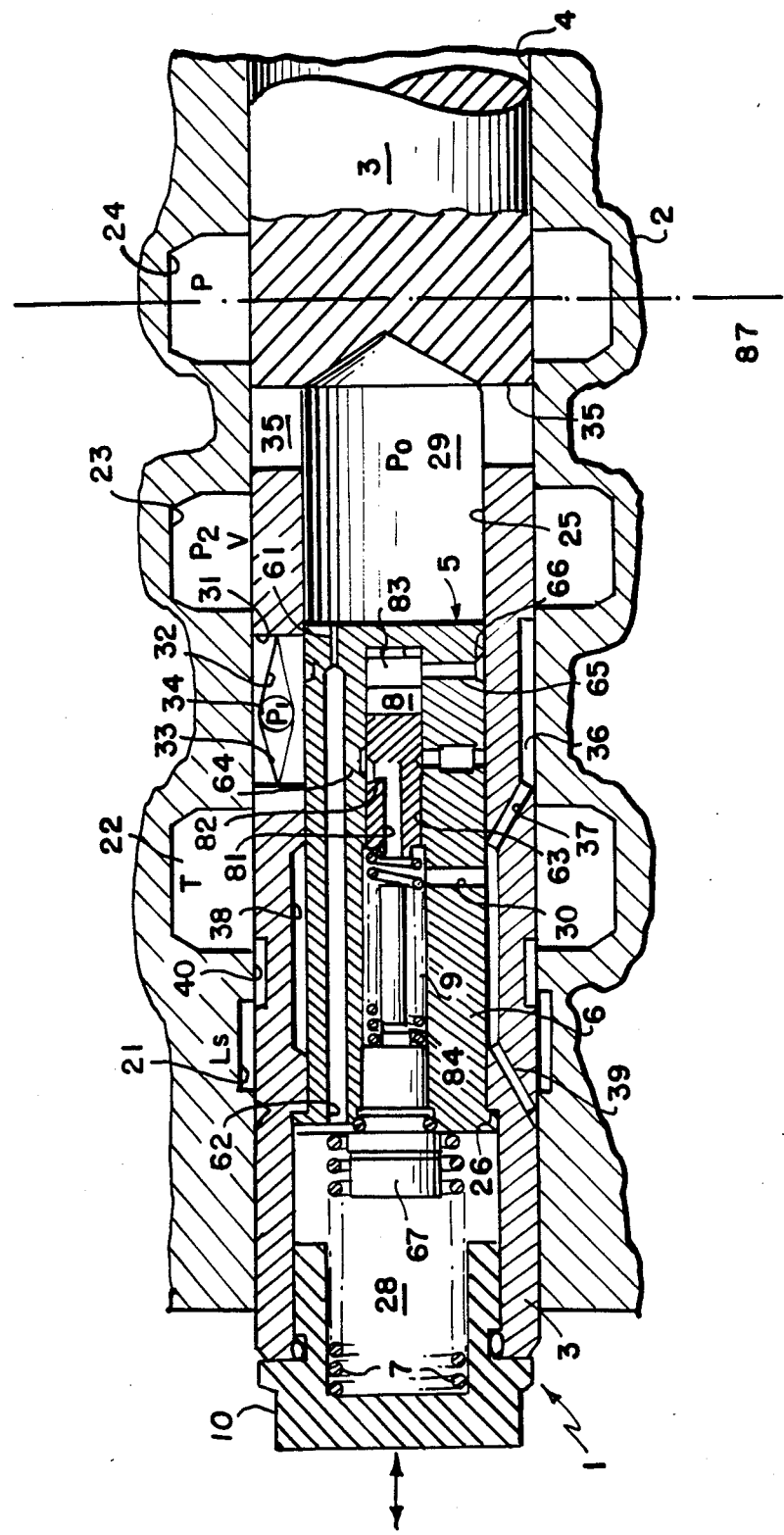
FIG. 2 is a longitudinal sectional view of the one half of a 4/3 directional flow control valve of the invention.

FIG. 2 shows a pilot controlled flow control valve of FIG. 1 arranged in accordance with the invention within the spool 3 of a directional control valve 1. It should be noted that the particular advantage of the embodiment yet to be described resides in the fact that for both a connection of the pump with the user as well as for a connection of the user with the tank a pilot controlled flow control may be achieved.

FIG. 2 discloses schematically a 4/3 directional flow control valve 1 which comprises in substance a housing 2 and a spool (a longitudinal spool) 3 arranged within a longitudinal bore 4 of the housing 2. In FIG. 2 the ports for a second user as well as another tank port are not shown. Said not shown ports are located symmetrically with respect to the line 87 of symmetry. Also, springs required for positioning the spool 3 in its middle position of FIG. 2 are not shown for reasons of simplicity. Further, a cover surrounding the left end of spool 3 in FIG. 2 is not shown.

Within the valve housing 2 annular channels 22, 23, 24 are provided in a known manner ending at the longitudinal bore 4. Said annular channels allow the respective connection with a tank T, a first user V and the pump P. Off-set with respect to the ring channel 22 towards the left is an annular groove 21, said groove 21 is used for communicating a signal Ls yet to be described.

In accordance with the invention a longitudinal bore 25 in the spool 3 is provided in the form of a tap bore in which an adjustment element in the form of an adjustment piston or spool 6 is reciprocally mounted. The adjustment piston 6 abuts in its rest position shown in FIG. 2 by means of an extension at an abutment 26 formed by bore 25. The adjustment piston 6 is maintained in its rest position by means of a pressure or adjustment spring 7. Said spring 7 acts between a cover 10 closing the longitudinal bore 25 and the piston 6.

An annular groove 40 is provided in the outer circumference of piston 3. Said annular groove 40 connects in the rest position of the piston 3 the annular groove 21 (Ls) and the annular channel 22 (T). Moreover, a passage 31 connecting the outer circumference of the piston 3 with the bore 25 is provided. The passage 32 and 33 comprise symmetric throttle characteristics.

The passage 31 comprises contiguous to a bore 34 two symmetric throttle slots of triangular cross section. The representation of FIG. 2 is of a schematic nature in so far as the shown plan view of the throttles 32, 33 in the bore 34 should be rotated by 90°, i.e. it should actually point upwardly towards the housing. With the piston 3 in its rest or middle position the passage 31 provides neither a connection with the user V nor with the tank T.

Within the piston 3 a plurality of radial bores 35 are provided connecting the space defined by the bore 25 with the outer surface of the piston 3. In the rest position of the piston 3 bores 35 are arranged between the user port or ring channel 23 and the pump port or ring channel 24.

Moreover, a longitudinal channel 36 is provided in the outer surface of piston 3. The longitudinal channel 36 is connected with an annular recess 38 provided at the inner surface of the piston 3. An inclined channel 37 provides for said connection. The annular recess 38, in turn, is connected via an inclined channel ending at the outer surface of the piston 3 with said annular groove 21. Said channel system 36, 37, 38, 39 will connect the user V with the annular groove 21 if the piston 3 is moved by more than the distance S toward the right, so that from annular groove 21 the signal $L_S$ representing the load or user pressure may be supplied.

The adjustment piston 6 defines at its both ends adjustment piston end spaces 28 and 29, respectively, and is further provided with a middle bore 63 within which a control spool or piston 8 is reciprocally mounted. The control piston 8 defines at its one end a pressure end space 83 and at its other end a pressure end space 84. Within the pressure end space 84 a control spring 9 is located acting between a closing plug 67 (closing the middle bore 63) and the control piston 8.

A longitudinal bore 62 extends parallel to the middle bore 63 and connects the control piston end space 28 by means of a fixed metering orifice 61 in the adjustment piston 6 with the control piston end space 29.

At the outer circumference of the adjustment piston 6 a circumferential groove 66 is provided, a groove which is connected via one (or a plurality) of radial bores 65 with the pressure end space 83. The pressure existing in the area of the passage 31 can therefore be transmitted to the pressure end space 83. A radial bore 30 connects the pressure end space 84 with the outside of the adjustment piston 6 in the area of the annular recess 38.

Moreover, the longitudinal bore 62 is connected via a radial bore 64 with a circumferential groove 82. Said circumferential groove 82 is provided in the outer circumference of the control piston 8. The circumferential groove 82 is connected with the pressure end space 84 via a bore 81.

The unit of the invention comprising the adjustment piston and the control piston is referred to with the reference numeral 5.

Figure 3:
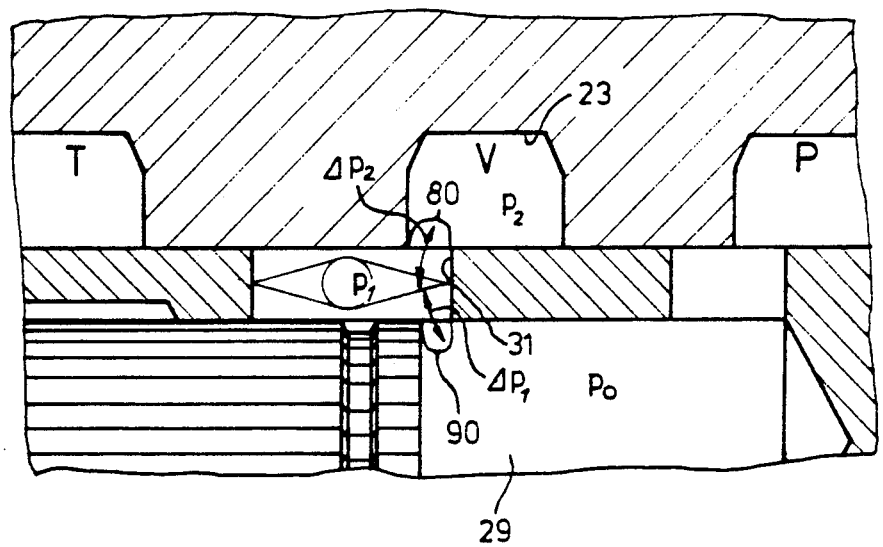
FIG. 3 is a detail of the sectional view of FIG. 2.

FIG. 3 is an enlarged representation of what is shown in FIG. 2 in the area of the passage 31. In fact, in FIG. 3 spool 3 as well as piston 6 are moved with respect to their respective rest positions. It is shown that a variable metering orifice (throttle position) 80 is defined between the ring channel 23 and the passage 31. Said variable metering orifice 80 is also shown in FIG. 1. It is further to be recognized that between the piston end space 29 and the passage 31 a throttle location 90 is defined, a throttle location which is also shown in FIG.

1. At the metering orifice 80 the pressure differential $\Delta P_2$ occurs, while at the throttle location 90 the pressure differential $\Delta P_1$ is created.

The 4/3 directional flow control valve of FIGS. 2 and 3 corresponds in its function to the two directional flow control valve 10 of FIG. 1 as far as the parts shown in FIG. 2 are concerned. Inasmuch as the function of the two directional flow control valve of FIG. 1 is known, a detailed description of the function of FIG. 2 may be omitted.

Apart from the above described inventive features the flow control valve 1 of FIGS. 2 and 3 comprises the following important means.

For some applications, for instance when used together with load sensing pumps, it is necessary that a signal Ls representing the user pressure be fed back to the pump. For this purpose, the present invention provides for the channel system 36, 37, 38, 39 within the adjustment piston 6. For a small movement of the piston 6 towards the right in FIG. 2 the channel system 36, 37, 38, 39 will be connected with the annular channel 23, and consequently the supply of the pressure signal Ls from the annular groove 21 is possible. Therefore, piston 3 operates in addition to carrying out his other functions as a connecting element for supplying the Ls signal.

Another important feature of the invention results from the fact that the passage 31 having symmetric throttle characteristics will not only provide for a load compensation when pump P is connected with user V, but also in a situation where the user V is connected with the tank T. In the first situation, the throttle 32 is in effect, while in the second situation the throttle 33 is operating. In both situations one and the same pressure compensator is used.

The invention was described in connection with a 4/3 directional flow control valve. It is however, also possible to use the invention in other directional control valves. For instance, the directional control valve 1 of FIG. 2 may serve as a 3/2 directional control valve if the (not shown) ports which are arranged in a mirror like manner with respect to the line 87 of symmetry, are not provided.

The following is a short description of the control sequence for a directional control valve 1 of FIG. 2 considering only the left half of the valve shown in FIG. 2. Moreover, it is assumed that it is intended to connect the user V with the pump P regardless of the load pressure, i.e. the amount of pressure medium supplied to the user is supposed to be independent of the load pressure and the pump pressure, respectively.

In case spool 3 is moved by more than the distance S towards the right, then firstly a connection will be provided between the ring channel 23 (user V), the channel system 36, 37, 38, 39 and the annular groove 21. With the spool 3 no longer in its rest position, the annular groove 21 will no longer be connected with the tank T, but is now subjected to the load pressure signal Ls, the load pressure signal Ls being derived from annular groove 21 and being supplied via channels (not shown) to the pump.

A continued movement of the spool 3 towards the right causes the flow of fluid (pressure medium) from the annular channel 24 (pump port P) to the control piston end space 29 and provides there a pressure build-up by the pressure $p_0$. A part of the pressure medium in the control piston end space 29 having the pressure $p_0$ flows via the metering orifice 61 and the longitudinal bore 62 to the control piston end space 28 and opposes, together with spring 7, the pressure $p_0$.

Assuming that the pressure in the piston end space 29 is 105 bar and that the pressure of the pressure medium in the piston end space 28 is 100 bar and that further the pressure caused by the spring 7 at the control piston 6 is 3 bar, then all in all a pressure differential in said piston end spaces 28 and 29 will exist in such a manner that the control piston 6 is moved toward the left in FIG. 2 so that a certain connection between the piston end space 29 and the ring channel 29 is provided via the throttle location 90 and the metering orifice 80. In accordance with the size of the metering orifice 80 adjusted by means of the movement of the piston 3, the pressure compensator will provide for a corresponding adjustment of the adjustment piston 6. It should be noted that the pressure compensator is subjected to the user pressure in the piston end space 84, a pressure which is supplied via channel 36/channel 37 annular recess 38 and radial bore 30. On the other hand the pressure $p_1$, present in passage 31, will act in the piston end space 83, supplied via circumferential groove 66 and connecting bore 65.

Depending on the size of the metering orifice 80 the control piston 8 will allow that more or less pressure medium can flow from the longitudinal bore 62 via the bore 81 to the user V, so that a corresponding axial movement of the unit 5 (formed by the adjustment spool/control piston) or the adjustment spool 6 itself is the consequence so that the size of the throttling location 90 is adjusted.

Due to the incorporation of the pilot controlled two directional flow control valve within a directional control valve a higher degree of stability is achieved, i.e. no fluttering effect will occur. The use of a pilot controlled two directional flow control valve provides for a relatively simple design and excellent operating conditions. One and the same pressure compensator provides for a load compensation of the connection between the user and the tank as well as for the connection of the tank with the user.

I claim:

1. An integral valving apparatus comprising:
   a valving apparatus housing, formed with a first longitudinal bore extending within said housing;
   at least first and second port means disposed in said valving apparatus housing, for providing a fluid communication with said first longitudinal bore;
   first spool means, mounted in said first longitudinal bore, for reciprocally moving within said first bore when a force is supplied thereto, said first spool means including means for selectively connecting said port means, said first spool means formed with a second longitudinal bore extending therewithin;
   second spool means, mounted in said second longitudinal bore of said first spool means, for reciprocally moving within said second longitudinal bore when a force is supplied thereto, said second spool means including a third bore located therewithin;
   control spool means mounted in said third bore for reciprocally moving in said third bore; and
   means, provided in said first spool means, said second spool means and said control spool means, for selectively connecting said first, second and control spool means such that the valving apparatus operates as a pilot controlled flow control valve within a directional control valve spool.

2. The invention of claim 1 further comprising a third port means, wherein said first port means is a pump port P, said second port means is a user port V, and said third port means is a tank port T.

3. The invention of claim 2 wherein the flow control valve comprises a two directional control valve.

4. The invention of claim 3 wherein the flow control valve is of a symmetric design such that a flow control is provided between said pump port P and user port V as well as between user port V and tank port T.

5. The invention of claim 2 wherein the directional control valve is a 2/3 directional control valve with a single flow control valve being provided in said 2/3 directional control valve.

6. The invention of claim 2 wherein the directional control valve is a 4/3 directional control valve with two flow control valves being built into said 4/3 directional control valve.

7. The invention of claim 2 wherein the valve is of a sandwich type design.

8. The directional control valve of claim 2 wherein said first spool means comprises means for supplying an additional signal based on a pressure at one of said port means.

9. The invention of claim 8 wherein a first annular groove is formed on the outer circumference of the first spool means, said first groove connecting to a second annular groove formed in said housing for delivering said signal associated with one of said port means in the rest position of the first spool means.

10. The invention of claim 9 wherein channel means are formed in said first spool means, for connecting said user port and said second annular groove prior to a connection between the pump port and the user port when said first spool means is moved, so as to supply said additional signal.

11. The invention of claim 2 wherein said second spool means abuts in its rest position with an extension at an abutment formed by said second bore (25).

12. The invention of claim 2 further comprising a pressure spring and a cover, wherein said pressure spring biases said second spool means into a rest position, said spring acting between said cover closing said second longitudinal bore (25) and said second spool means (6).

13. The invention of claim 2, further comprising passage means, having symmetric throttle characteristics and formed in said first spool means, for providing a connection between the tank port T and the user port V, respectively, with said second longitudinal bore.

14. The invention of claim 13 wherein the passage means includes two symmetrically arranged throttle slots.

15. The invention of claim 14 wherein the throttle slots are of triangular cross section.

16. The invention of claim 13 wherein a throttle location is formed between the edge of the second spool means and the passage means.

17. The invention of claim 13 wherein a metering orifice is formed between the passage means and an annular channel defining one of said port means.

18. The invention of claim 17 wherein a throttle location and a metering orifice, respectively, are also formed by the other end of the passage means with an appropriate annular channel of another of said port means.

* * * * *